(12) United States Patent
Hsu et al.

(10) Patent No.: US 10,606,427 B2
(45) Date of Patent: Mar. 31, 2020

(54) MUTUAL CAPACITIVE TOUCH PANEL

(71) Applicant: ILI TECHNOLOGY CORP., Hsinchu County (TW)

(72) Inventors: Cheng-Hsien Hsu, Hsinchu County (TW); Guo-Kiang Hung, Hsinchu County (TW); Ching-Chun Chiang, Hsinchu County (TW); Wei-Lun Kuo, Hsinchu County (TW); Peng-Yun Ding, Hsinchu County (TW)

(73) Assignee: ILI TECHNOLOGY CORP., Hsinchu County (TW)

( * ) Notice: Subject to any disclaimer, the term of this patent is extended or adjusted under 35 U.S.C. 154(b) by 0 days.

(21) Appl. No.: 16/198,892

(22) Filed: Nov. 23, 2018

(65) Prior Publication Data
US 2019/0220114 A1 Jul. 18, 2019

(30) Foreign Application Priority Data
Jan. 18, 2018 (TW) .............................. 107101811 A

(51) Int. Cl.
*G06F 3/044* (2006.01)
*G06F 3/041* (2006.01)

(52) U.S. Cl.
CPC ............ *G06F 3/044* (2013.01); *G06F 3/0446* (2019.05); *G06F 3/0448* (2019.05); *G06F 3/0445* (2019.05); *G06F 3/04164* (2019.05); *G06F 2203/04107* (2013.01)

(58) Field of Classification Search
CPC ...... G06F 3/044; G06F 3/0448; G06F 3/0445; G06F 3/0446; G06F 3/04164; G06F 2203/04107
See application file for complete search history.

(56) References Cited

U.S. PATENT DOCUMENTS

| 10,168,844 B2* | 1/2019 | Kwon | H01L 51/5256 |
|---|---|---|---|
| 10,345,979 B2* | 7/2019 | Chan | |
| 10,387,705 B2* | 8/2019 | Liu | G06K 9/0002 |
| 2011/0156930 A1* | 6/2011 | Chen | G06F 3/044 341/33 |
| 2012/0044193 A1* | 2/2012 | Peng | G06F 3/044 345/174 |

(Continued)

FOREIGN PATENT DOCUMENTS

WO WO-2012014206 A2 * 2/2012 ............ G06F 3/044

*Primary Examiner* — Julie Anne Watko
(74) *Attorney, Agent, or Firm* — JCIPRNET

(57) ABSTRACT

A mutual capacitive touch panel includes a first electrode layer and a second electrode layer. The first electrode layer includes a plurality of electrode groups and a plurality of electrode groups arranged in an array. The first electrode groups located at the same column are electrically connected to a form a first electrode series, and the second electrode groups located at the same column are electrically connected to form a second electrode series. The second electrode layer includes a plurality of electrode strip groups insulated from one another and sequentially arranged along a column direction of the array, wherein each of the electrode strip groups extends along a row direction of the array and overlaps, a perpendicular projection direction, electrode groups of two adjacent rows, and two adjacent of the electrode strip groups overlap, in the perpendicular projection direction, the electrode groups of the same row.

16 Claims, 13 Drawing Sheets

(56) References Cited

U.S. PATENT DOCUMENTS

| | | | | |
|---|---|---|---|---|
| 2013/0050108 A1* | 2/2013 | Hong | ................... | G06F 3/0416 |
| | | | | 345/173 |
| 2013/0181940 A1* | 7/2013 | Lai | ......................... | G06F 3/044 |
| | | | | 345/174 |
| 2013/0300707 A1* | 11/2013 | Hershman | ............... | G06F 3/044 |
| | | | | 345/174 |
| 2015/0022470 A1* | 1/2015 | Lee | ...................... | G06F 3/0412 |
| | | | | 345/173 |
| 2015/0069373 A1* | 3/2015 | Lee | ...................... | H01L 27/323 |
| | | | | 257/40 |
| 2015/0070305 A1* | 3/2015 | Seo | ...................... | G06F 3/0412 |
| | | | | 345/174 |
| 2016/0328070 A1* | 11/2016 | Lin | ...................... | G06F 3/0416 |
| 2016/0349889 A1* | 12/2016 | Yang | ................... | G02F 1/13338 |
| 2016/0357285 A1* | 12/2016 | Ono | ......................... | G06F 3/044 |
| 2017/0269746 A1* | 9/2017 | He | ...................... | G02F 1/13338 |
| 2017/0364176 A1* | 12/2017 | Kim | ...................... | G06F 3/0416 |
| 2019/0107911 A1* | 4/2019 | Zhai | ...................... | G06F 3/0412 |
| 2019/0196620 A1* | 6/2019 | Shu | ......................... | G06F 3/044 |

* cited by examiner

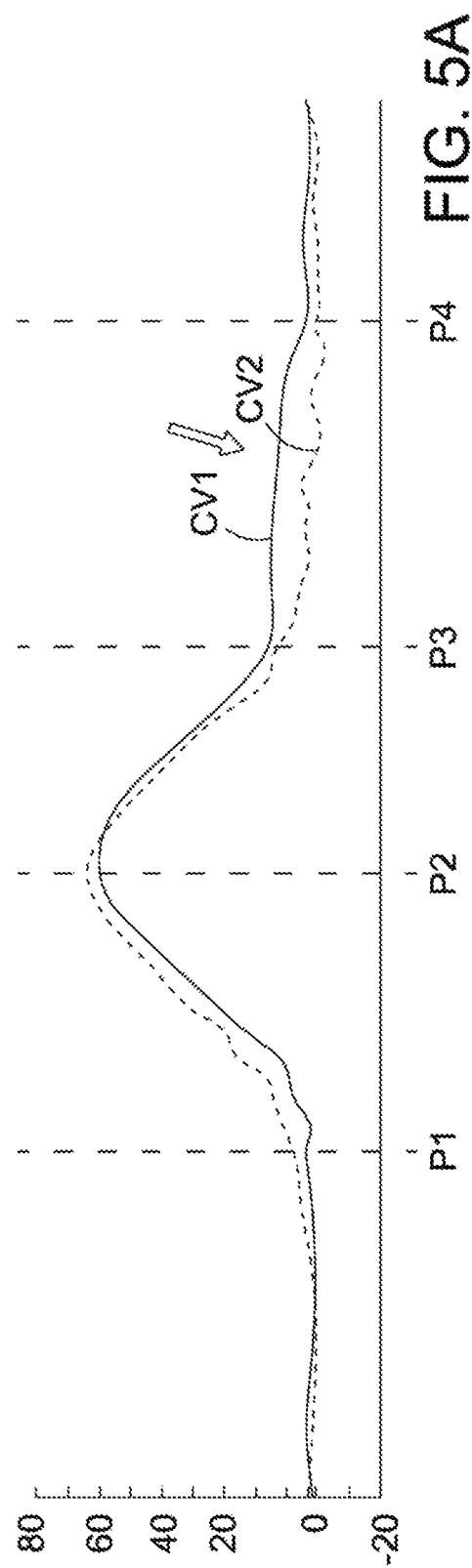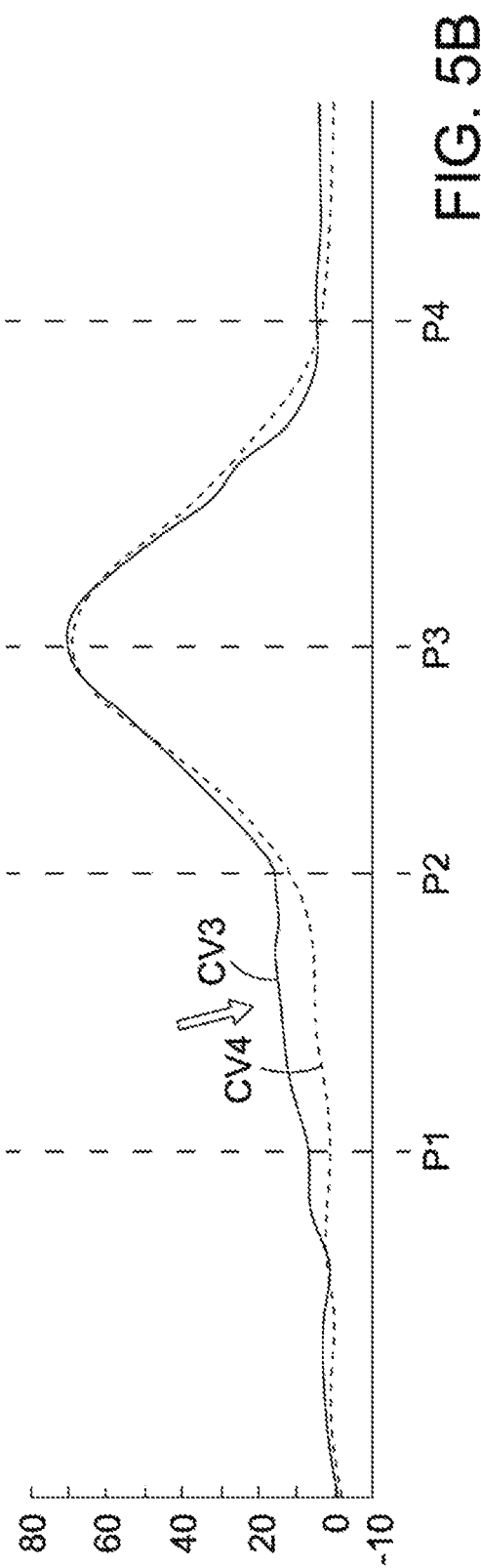

MUTUAL CAPACITIVE TOUCH PANEL

This application claims the benefit of Taiwan application Serial No. 107101811, filed Jan. 18, 2018, the subject matter of which is incorporated herein by reference.

BACKGROUND OF THE INVENTION

Field of the Invention

The invention relates to a mutual capacitive touch panel, and more particularly, to a double-layer mutual capacitive touch panel.

Description of the Related Art

With the constantly innovating technologies, touch display devices, consisting a display device and a touch panel, are capable of simultaneously implementing touch control and display functions to offer human-machine interactivity, and are extensively applied in electronic products such as smart phones, GPS navigation systems, tablet computers and laptop computers. Among current touch panels, mutual capacitive touch panels featuring advantages of high accuracy, multi-touch, good durability and high touch resolution have become the mainstream touch technology currently used in industry.

The mutual capacitive touch control technology determines a touch control event primarily through detecting a coupling capacitance change generated by static electricity on a touching object and touch control units on a touch panel, when the touching object approaches or touches the touch control units. The mutual capacitive touch control technology, in the aspect of structural design, is mainly categorized into two types—single-layer electrode structures and double-layer electrode structures. Because structural designs and control algorithms of a double-layer electrode structure are simpler than those of single-layer electrode structure, the design of a double-layer electrode structure is commonly applied in mid- to high-end consumer electronic products. In a conventional double-layer electrode structure, sensing series and driving series respectively extend along a horizontal direction and a vertical direction that are perpendicular to each other, it is thus necessary that conductive lines connect the sensing series from two sides of the sensing series, such that the ranges of border regions at the two horizontal sides of a touch panel cannot be reduced.

Thus, in another conventional solution, driving series of the same column are divided into two driving series, and two adjacent sensing series are electrically connected to each other, so as to reduce the number of conductive lines for connecting sensing series and to further effectively reduce the width of borders of a touch panel. However, in the above architecture, when a touching object moves in a straight line along the Y-axis direction, sensing coordinates sensed by the sensing series appear in a variant density distribution. In other words, when a touching object moves equidistantly in a straight line at different positions on the Y-axis and along the X-axis direction, the intervals on the straight line sensed by the sensing series are not constant but appear in alternating high and low densities in the straight line arranged along the Y-axis, resulting in detection inaccuracy, as shown in FIG. 1. Although such issue can be eliminated by algorithms, operation resources and processing time are inevitably consumed to cause a load on a processor. Therefore, there is a need for continually enhancing the touch accuracy of a touch panel.

SUMMARY OF THE INVENTION

It is an object of the present invention to provide a mutual capacitive touch panel for enhancing detection accuracy in the Y-axis direction.

To achieve the above object, the present invention discloses a mutual capacitive touch panel including a first electrode layer, a second electrode layer and an insulation layer. The first electrode layer includes a plurality of electrode groups arranged in an array. The electrode groups include a plurality of first electrode groups and a plurality of second electrode groups. The first electrode groups are located at odd-number columns, and the second electrode groups are located at even-number columns. The first electrode groups located at the same column are electrically connected to form a first electrode series, and the second electrode groups located at the same column are electrically connected to form a second electrode series. The second electrode layer is provided on the first electrode layer, and includes a plurality of electrode strip groups insulated from one another and sequentially arranged along a column direction of the array and in a touch region. Each of the electrode strip groups extends along a row direction of the array and overlaps, in a perpendicular projection direction, the electrode groups of two adjacent rows, and two adjacent of the electrode strip groups overlap, in a perpendicular projection direction, the electrode groups of the same row. The insulation layer is provided between the first electrode layer and the second electrode layer. In each column, each of the first-row electrode group and the last-row electrode group includes an electrode, and each of the remaining electrode groups at least includes two electrodes arranged along the column direction of the array. Further, in each column, two adjacent electrodes of each first electrode group and two adjacent electrodes of each second electrode group are sequentially and alternatingly arranged along the column direction of the array.

In the mutual capacitive touch panel of the present invention, two adjacent electrodes of each first electrode group and two adjacent electrodes of each second electrode group are designed to be sequentially and alternatingly arranged along the column direction of the array. Thus, there is no offset between the position of detected in the column direction and the actual position of the touching object, thereby effectively enhancing the touch accuracy in the column direction (the Y-axis), reducing the use of algorithms and hence the consumption of computation resources, and increasing the touch response time.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 5A is a relationship schematic diagram of sensing amount versus position for mutual capacitive touch panels in a comparison example and according to the first embodiment of the present invention when a touching object is located at a position P2;

FIG. 5B is a relationship schematic diagram of sensing amount versus position for mutual capacitive touch panels in a comparison example and according to the first embodiment of the present invention when a touching object is located at a position P3;

DETAILED DESCRIPTION OF THE INVENTION

Figure 1:
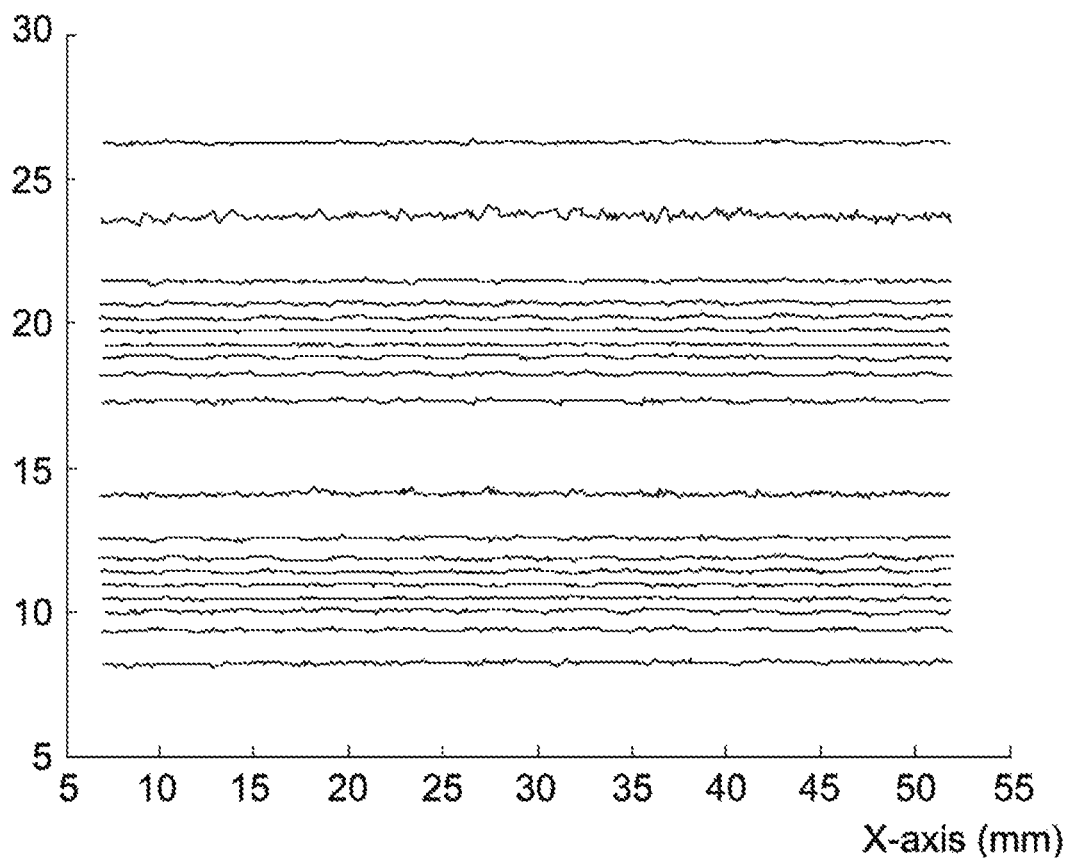
FIG. 1 depicts motion trajectories detected by a conventional mutual capacitive touch panel when a touching object moves equidistantly in a straight line at different positions on the Y-axis and along the X-axis direction.

For a person skilled in the art to better understand the present invention, compositions of and effects to be achieved by the present invention are given in detail in the non-limiting embodiments with the accompanying drawings below. It should be noted that, the drawings are simplified schematic diagrams, which depict only combination relationships of components associated with the present invention to better describe the fundamental structures of the present invention, and actual components and layouts may be more complex. For illustration purposes, the components in the drawings of the present invention are not drawn to actual quantities, shapes and sizes, and detailed proportions may be adjusted according to actual design requirements.

Figure 2:
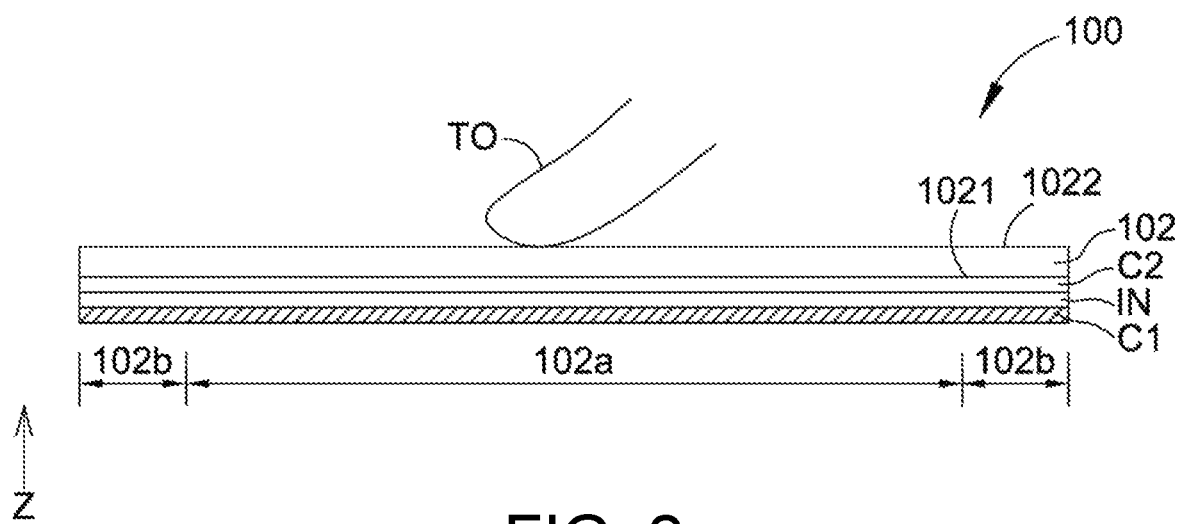
FIG. 2 is a side schematic diagram of a mutual capacitive touch panel of the present invention.

FIG. 2 shows a side schematic diagram of a mutual capacitive touch panel according to a first embodiment of the present invention. As shown in FIG. 2, a mutual capacitive touch panel 100 of this embodiment is for detecting a touch position of a touching object TO, and has a touch region 102a and a border region 102b. The touch region 102a includes driving electrodes and sensing electrodes, and the border region 102b includes conductive lines. In this embodiment, the border region 102b may, for example but not limited to, surround the touch region 102a. The mutual capacitive touch panel 100 includes a first electrode layer C1, a second electrode layer C2 and an insulation IN. The insulation layer IN is provided between the first electrode layer C1 and the second electrode layer C2. The first electrode layer C1 and the second electrode layer C2 may be electrically insulated from each other through the insulation layer IN provided in between, and the second electrode layer C2 is closer to a touching object for inputting an instruction compared to the first electrode layer C1. For example, the touching object TO may be a finger or a stylus. In this embodiment, the mutual capacitive touch panel 100 may further include a substrate 102, and the second electrode layer C2, the insulation layer IN and the first electrode layer C1 are sequentially formed on a first side 1021 of the substrate 102, and a second side 1022 of the substrate 102 is closer to the touching object TO compared to the first side 1021. The mutual capacitive touch panel 100 of the present invention is, for example but not limited to, a stacked structure. In another embodiment, the first electrode layer C1 and the second electrode layer C2 may be respectively formed on thin films, and the thin film provided with the second electrode layer C2 and the thin film provided with the first electrode layer C1 are adhered to the substrate 102 through two bonding layers, so as to form the mutual capacitive touch panel 100. In this embodiment, the thin film between the first electrode layer C1 and the second electrode layer C2 may serve as the insulation layer IN. In another embodiment, the first electrode layer C1, the insulation layer IN and the second electrode layer C2 may also be sequentially formed on a display surface of the display panel, e.g., on a color filter substrate of an LCD panel or a packaging cover lens of an organic light-emitting diode (OLED) display panel, and the first electrode layer C1 is covered by the substrate 102. Further, the substrate 102 may include a hard substrate or a flexible substrate, e.g., a glass substrate, a reinforced glass substrate, a quartz substrate, a sapphire substrate, a hard cover lens, a plastic substrate, a flexible cover lens, a flexible plastic base or a thin glass substrate.

Figure 3:
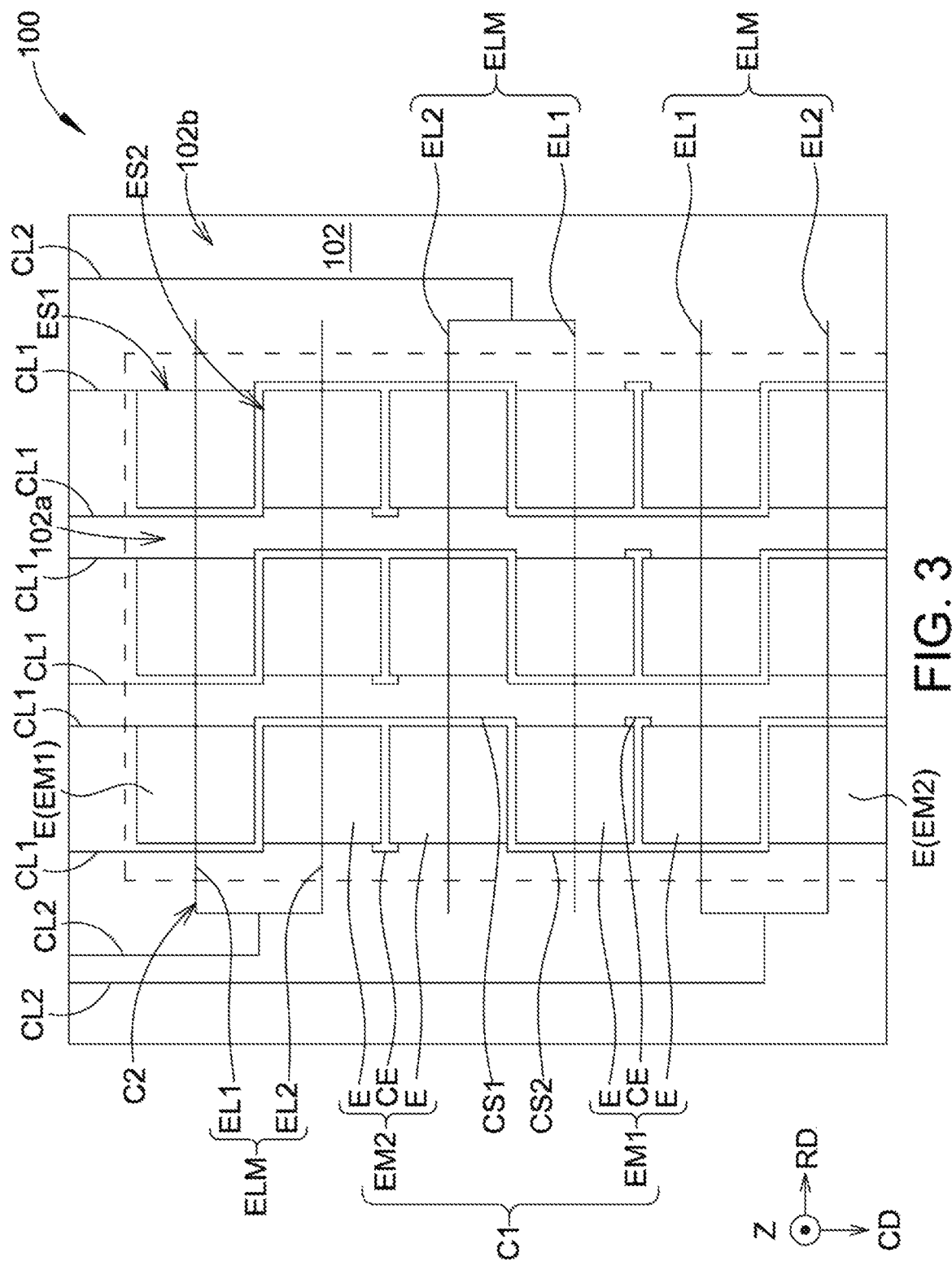
FIG. 3 is a top schematic diagram of a mutual capacitive touch panel according to a first embodiment of the present invention.

FIG. 3 shows a top schematic diagram of a mutual capacitive touch panel according to a first embodiment of the present invention. As shown in FIG. 3, the first electrode layer C1 of this embodiment includes a plurality of electrode groups arranged in an array and separated from one another. The electrode groups may include a plurality of first electrode groups EM1 and a plurality of second electrode groups EM2, and the first electrode groups EM1 and the second electrode groups EM2 located in the same column are sequentially and alternatingly arranged along a column direction CD (e.g., Y-axis) of the array. In other words, in each column of the array, the first electrode groups EM1 are located in odd-number rows and the second electrode groups EM2 are located in even-number rows, the first electrode EM1 groups located in the same column are electrically connected to form a first electrode series ES1, and the second electrode groups EM2 located in the same column are electrically connected to form a second electrode series ES2. In this embodiment, in each column, each of the first-row electrode group and the last-row electrode group includes one electrode E, and each of the remaining electrode groups at least includes two electrodes E arranged along the column direction CD of the array, such that the electrodes E can also be arranged in an array. The electrodes E of the electrode groups are separated but electrically connected. In other words, in each column, two adjacent and electrically connected electrodes E of each first electrode group EM1 and two adjacent and electrically connected electrodes E of each second electrode group EM2 may be sequentially and alternatingly arranged along the column direction CD. In this embodiment, each electrode group may further include an electrode connecting line segment CE connecting two electrodes E, such that every two adjacent electrodes E in each column may be electrically connected to each other. The electrodes E have, for example but not limited to, the same size.

The first electrode layer C1 may further include a plurality of first connecting line segments CS1 and a second connecting line segments CS2. Each of the first connecting line segments CS1 connects two adjacent first electrode groups EM1 located in the same column, enabling the first electrode groups EM1 located in the same column to be connected in series to form the first electrode series ES1. Each of the second connecting line segments CS2 connects two adjacent second electrode groups EM2 located at the same column, enabling the second electrode groups EM2 located at the same column to be connected in series to form the second electrode series ES2. The electrodes E, the electrode connecting line segments CE, the first connecting line segments CS1 and the second connecting line segments CS2 are located on the same plane. In this embodiment, the first connecting line segments CS1 corresponding to the first electrode groups EM1 of the same column and the second connecting line segments CS2 corresponding to the second electrode groups EM2 of the same column are respectively provided on two sides of the electrode groups of the same column, e.g., provided on the left side and the right side, or vice versa. Thus, the first connecting line segments CS1 and the second connecting line segments CS2 can be separated, so as to form the first connecting line segments CS1 electrically connected to the first electrodes E1 of the same column and the second connecting line segments CS2 electrically connecting the second electrodes E2 of the same column in the same first electrode layer C1, and to allow the first electrode series ES1 and the second electrode series ES2 formed by the first electrode layer C1 to be electrically insulated from each other. Further, any two adjacent electrodes E located in the same row but different columns are separated and insulated from each other, such that the first electrode series ES1 of different columns are insulated from one another and the second electrode series ES2 of different columns are separated and insulated from one another. In one embodiment, the electrodes E of each column overlap one another in the column direction CD of the array and are aligned, and the first connecting line segments CS1 and the second connecting line segments CS2 do not overlap, in the column direction CD of the array, the electrodes E.

The second electrode layer C2 includes a plurality of electrode strip groups ELM, which are insulated from one another and sequentially arranged along the column direction CD of the array and in the touch region 102a. Each of the touch electrode strip groups ELM extends along a row direction RD of the array and overlaps, in a perpendicular projection direction Z, the electrode groups of two adjacent rows, and two adjacent electrode strip groups ELM overlap, in the perpendicular projection direction Z, the electrode groups of the same row. Each of the electrode strip groups ELM may include two electrode strips electrically connected to each other and respectively extending along the row direction RD (e.g., the X-axis) of the array, and each of the electrode strips may overlap, in the perpendicular projection direction Z, the electrodes E of the same row. The electrode strips of each electrode strip group ELM may be electrically connected to one another in the touch region 102a or in another in the border region 102b. More specifically, the electrode strips of each electrode strip group ELM may be a first electrode strip EL1 and a second electrode strip EL2, respectively. Further, each first electrode strip EL1 overlaps, in the perpendicular projection direction Z, the electrodes E of the same row in the first electrode group EM1 of the same row, such that each first electrode strip EL1 and the correspondingly overlapping electrode E mutually capacitively couple and form a touch unit; each second electrode strip EL2 overlaps, in the perpendicular projection direction Z, the electrodes E of the same row in the second electrode group EM2 of the same row, such that each second electrode strip EL2 and the correspondingly overlapping electrode E mutually capacitively couple and form another touch unit. Further, because two electrodes E of each electrode group EM are adjacent to each other and two electrodes E of each second electrode group EM2 are adjacent to each other, two adjacent first electrode strips EL1 respectively overlap the electrodes E of two adjacent rows of the first electrode groups EM1 of the same row, and two adjacent second electrode strips EL2 respectively overlap the electrodes E of two adjacent rows of the second electrode groups EM2 of the same row. In other words, in the same column, because two adjacent electrodes E of each first electrode group EM1 and two adjacent electrodes E of each second electrode group EM2 are sequentially and alternatingly arranged, every two adjacent first electrode strips EL1 and every two adjacent second electrode strips EL2 can also be sequentially and alternatingly arranged along the column direction CD, such that the same electrode group ELM may overlap the electrodes E of different electrode groups (i.e., overlapping the electrodes of one row of the first electrode group EM1 and the electrodes E of one row of the second electrode group EM2), and different electrode strip groups ELM may overlap the electrodes E electrically connected to one another in the same electrode group (i.e., overlapping electrodes E of two rows in the first electrode group EM1 or the electrodes E of two rows in the second electrode group EM2). With the above configuration, when the touching object TO is close to a position between two adjacent electrode strip groups ELM, the sensing signals detected do not shift towards the center of one of the electrode strip groups ELM, thus improving the issue of alternatingly high and low densities produced when a motion trajectory moves in the straight line along the column direction CD, and enhancing the detection accuracy of the mutual capacitive touch panel 100.

In this embodiment, to have each electrode strip group conform to the design of two electrode strips, each first-row first electrode group EM1 may include only one electrode E, each last-row second electrode group EM2 may include only another electrode E, and each electrode group located at the $2n^{th}$ and $(2n+1)^{th}$ rows may include two electrodes E, where n is a positive integer and 2n is smaller than the total of rows of the electrodes E. That is to say, the electrodes E located at the first row and the second row are insulated from one another, and may respectively overlap, in the perpendicular projection direction Z, the first electrode strip EL1 and the second electrode strip EL2 of the same electrode group ELM. Similarly, the electrodes E located at the second last row and the last row may respectively overlap, in the perpendicular projection direction Z, the first electrode strip EL1 and the second electrode strip EL2 of the same electrode strip group ELM. The design of the first electrode groups and the second electrode groups of the present invention is not limited to the above example. Further, for example, the first electrode series ES1 and the second electrode series ES2 may respectively be driving electrodes for transmitting driving signals, and the electrode strip groups ELM may be sensing electrodes for generating sensing signals according to the corresponding driving signals. In another embodiment, the first electrode series ES1 and the second electrode series ES2 may respectively be sensing electrodes, and the electrode strip groups ELM may be driving electrodes.

In this embodiment, the mutual capacitive touch panel 100 may further include a plurality of first conductive lines CL1 and a plurality of conductive lines CL2 provided on the substrate 102 in the border region 102b. The first conductive lines CL1 are respectively electrically connected to the first electrode series ES1 and the second electrode series ES2, and are for electrically connecting the first electrode series ES1 and the second electrode series ES2 to corresponding pads. The second conductive lines CL2 are respectively electrically connected to the first electrode strips EL1 and the second electrode strips EL2 of the electrode strip groups ELM, and are for electrically connecting the electrode strip groups ELM to corresponding pads.

Figure 4:
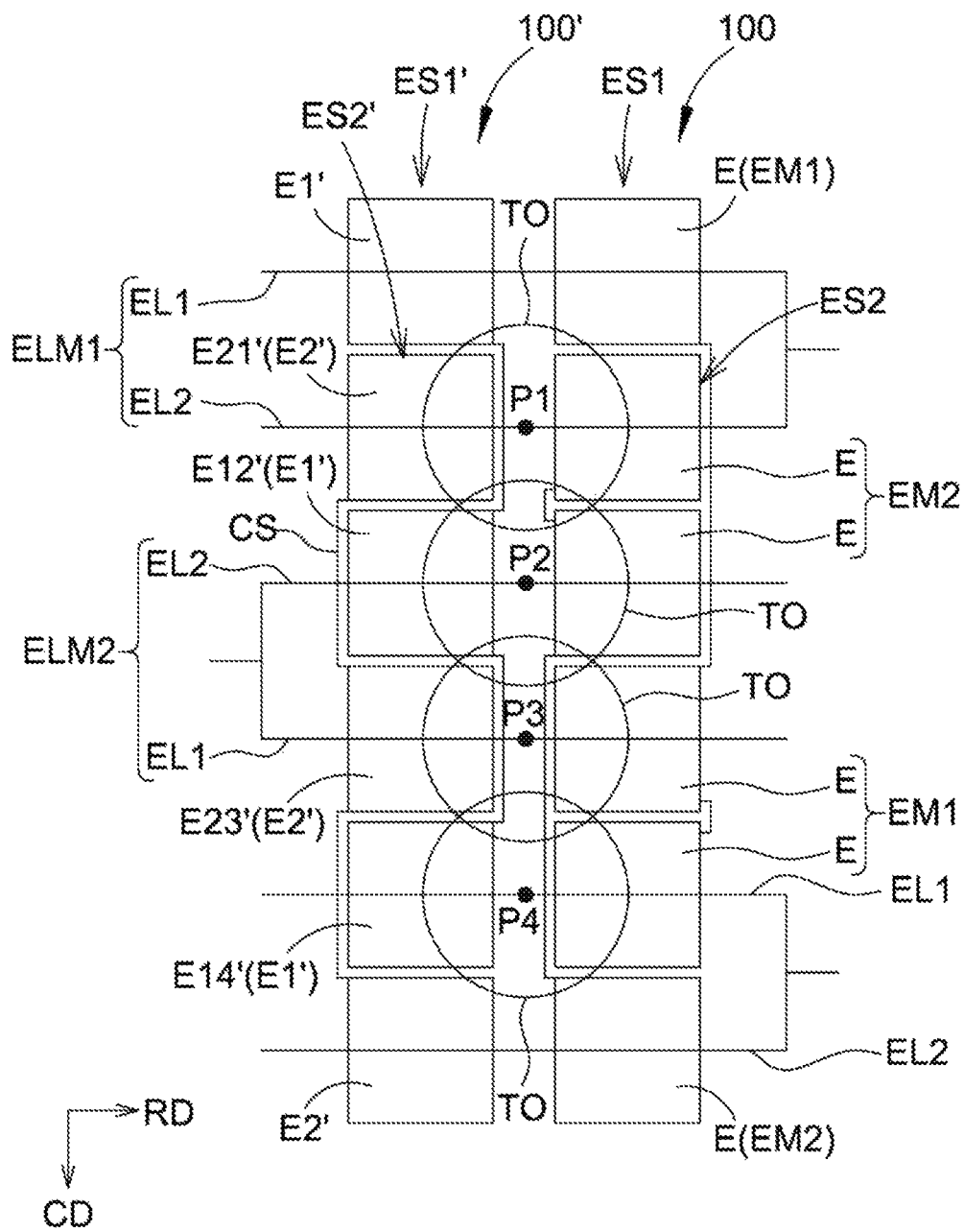
FIG. 4 is a top schematic diagram of the same electrode strips groups corresponding to a first electrode series and a second electrode series in a comparison example and a first electrode series and a second electrode series according to the first embodiment of the present invention.
Figure 6:
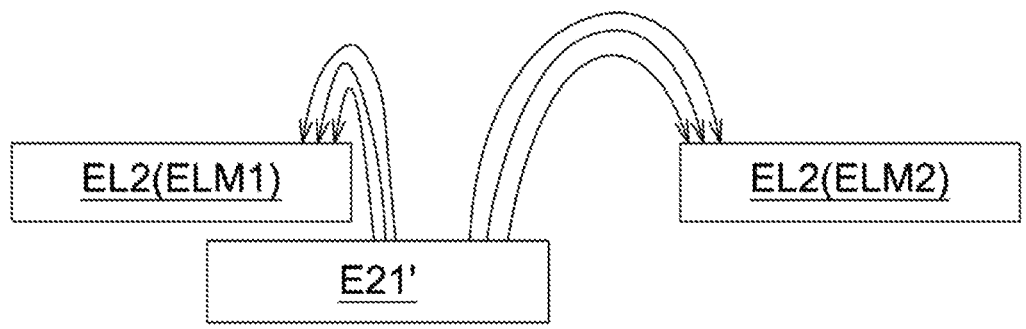
FIG. 6 is a schematic diagram of electric power lines produced by a second electrode with second electrode strips of different electrode strip groups in a comparison example.
Figure 7:
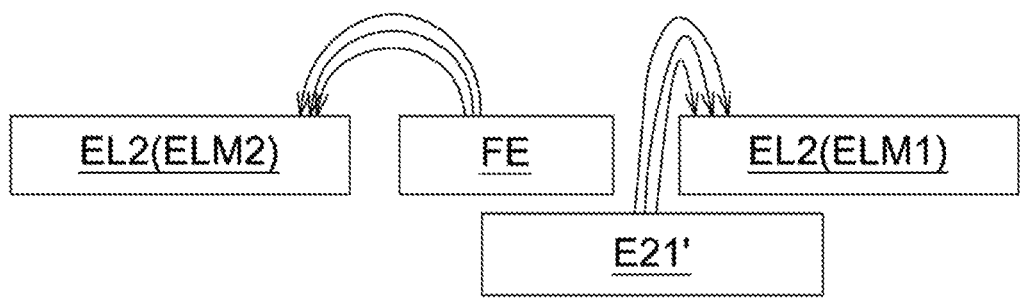
FIG. 7 is a schematic diagram of electric power lines produced by a second electrode with second electrode strips of different electrode strip groups through a floating electrode in another comparison example.
Figure 8:
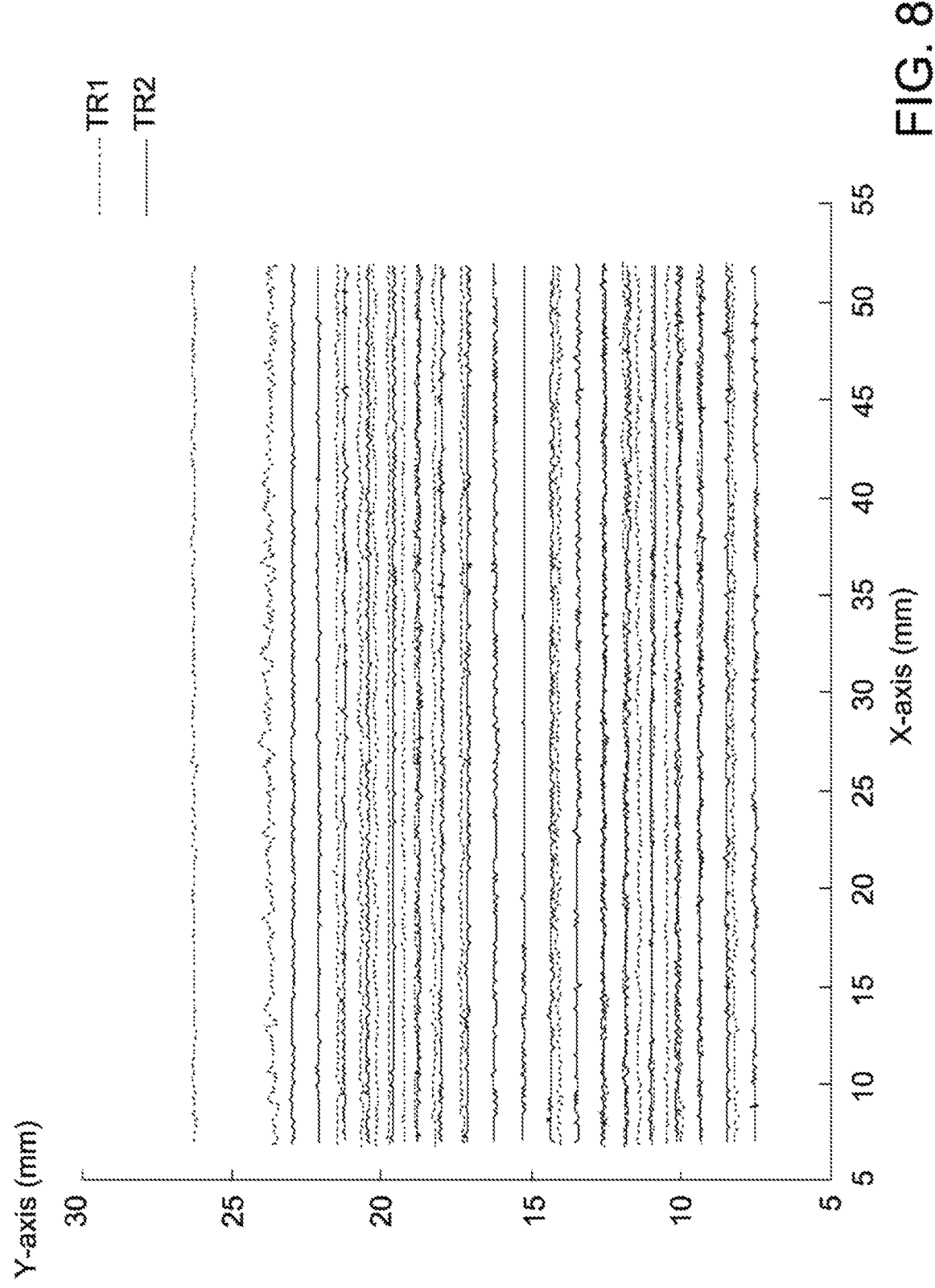
FIG. 8 depicts motion trajectories detected by mutual capacitive touch panels in a comparison example and according to the first embodiment of the present invention when a touching object moves equidistantly in a straight line at different positions on the Y-axis and along the X-axis direction.

In the description below, effects of configurations of the mutual capacitive touch panel 100 of this embodiment having the same electrode strip group ELM overlapping the electrodes E of different electrode groups and different electrode strip groups ELM overlapping the electrodes E electrically connected to one another in the same electrode group are given below. Refer to FIGS. 4 to 7. FIG. 4 shows a top schematic diagram of the same electrode strips groups corresponding to a first electrode series and a second electrode series in a comparison example and a first electrode series and a second electrode series according to the first embodiment of the present invention. FIG. 5A is a relationship schematic diagram of sensing amount versus position for mutual capacitive touch panels in a comparison example and according to the first embodiment of the present invention when a touching object is located at a position P2. FIG. 5B shows a relationship schematic diagram of sensing amount versus position for mutual capacitive touch panels in a comparison example and according to the first embodiment of the present invention when a touching object is located at a position P3. FIG. 6 shows a schematic diagram of electric power lines produced by a second electrode with second electrode strips of different electrode strip groups in a comparison example. FIG. 7 shows a schematic diagram of electric power lines produced by a second electrode with second electrode strips of different electrode strip groups through a floating electrode in another comparison example. FIG. 8 depicts motion trajectories detected by mutual capacitive touch panels in a comparison example and according to the first embodiment of the present invention when a touching object moves equidistantly in a straight line at different positions on the Y-axis and along the X-axis direction. As shown in FIG. 4, a first electrode series ES1' and a second electrode series ES2' on the left represent a mutual capacitive touch panel 100' of the comparison example, and the first electrode series ES1 and a second electrode series ES2 on the right represent a mutual capacitive touch panel 100 according to the above first embodiment. In the comparison example, second electrodes ES21' and E23' and first electrodes E12' and E14' are sequentially and alternatingly arranged along the column direction CD, a first electrode series ES1' are formed by connecting in series the first electrodes E12' and E14' of the same column, and a second electrode series ES2' is formed by connecting in series the second electrodes E21' and E23' of the same column. In this embodiment, each first electrode series ES1 are formed by connecting in series the first electrode groups EM1 having two adjacent electrodes E, and each second electrode series ES2 is formed by connecting in series the second electrode groups EM2 having two adjacent electrodes E.

As shown in FIG. 4 and FIG. 5A, when the touching object TO moves from a position P1 to the position P2, the relationship of sensing amount detected by the mutual capacitive touch panel 100' of the comparison example versus position is represented by a curve CV1, and the relationship of sensing amount detected by the mutual capacitive touch panel 100 of the first embodiment versus position is represented by a curve CV2. More specifically, when the touching object TO moves from the position P1 to the position P2 (i.e., moving from the electrode strip group ELM1 to the electrode strip group ELM2), in the comparison example, in addition to the change in the coupling capacitance between the first electrode E21' and the second electrode strip EL2 of the electrode strip group ELM2, there is also a change in the coupling capacitance between the second electrode E21' and the second electrode strip EL2 of the electrode strip group ELM2. Because the second electrode E21' is electrically connected to the second electrode E23' and the second electrode strip EL2 of the electrode strip group ELM2 is electrically connected to the first electrode strip EL1, the change in the coupling capacitance between the second electrode E21' and the second electrode strip EL2 of the electrode strip group ELM2 is also reflected in the change in the coupling capacitance between the second electrode E23' and the first electrode strip EL1 of the electrode strip group ELM2; that is, the sensing amounts of the second electrode E21' corresponding to the position P1 and the second electrode strip EL2 of the electrode strip group ELM2 corresponding to the position P2 are incorporated into the sensing amount corresponding to the position P3, as indicated by an arrow in FIG. 5A. In other words, when the touching object TO is at the position P2, the sensing amount that the mutual capacitive touch panel 100' of the comparison example provides correspondingly to the position P3 is higher in accuracy, such that the position detected is shifted towards the position P3. How the second electrode E21' and the second electrode strip EL2 of the electrode strip group ELM2 generate capacitance coupling may be shown as in FIG. 6, for example; that is, the second electrode E21' generates capacitance coupling with the second electrode strip EL2 of the electrode strip group ELM2 through the connecting line segment between second electrode E21' and the second electrode E23'. As shown in FIG. 7, in another comparison example, when a floating electrode FE is provided between the second electrode strip EL2 of the electrode strip group ELM1 and the second electrode strip EL2 of the electrode strip group ELM2, the second electrode E21' further generates capacitance coupling with the second electrode strip EL2 of the electrode strip group ELM2 through the floating electrode FE, thus increasing the sensing amount of the second electrode strip EL2 of the electrode strip group ELM2.

However, in this embodiment, the electrode E corresponding to the position P1 is electrically connected to the electrode E corresponding to the position P2, and the electrode E corresponding to the position P1 is not electrically connected to the electrode E corresponding to the position P3. Thus, when the touching object TO moves from the position P1 to the position P2, the change in the coupling capacitance between the electrode E1 corresponding to the position P1 and the second electrode strip EL2 of the electrode strip group ELM2 is not reflected in the change in the coupling capacitance between the electrode E corresponding to the position P3 and the first electrode strip EL1 of the electrode strip group ELM2, as the sensing amount indicated by an arrow in FIG. 5A. Hence, when the touching object TO is at the position P2, in this embodiment, the sensing amounts detected by the electrode E corresponding to the position P3 and the first electrode strip EL1 of the electrode strip ELM2 are not interfered by the change in the coupling capacitance between the electrode E corresponding to the position P1 and the second electrode strip EL2 of the electrode strip group ELM2. Therefore, the sensing amount detected by the mutual capacitive touch panel according to this embodiment is close to an accurate value, thus preventing an offset in the detected position and enhancing the touch accuracy for the touching object TO at the position P2.

Similarly, as shown in FIG. 4 and FIG. 5B, when the touching object TO moves from the position P3 to a position P4, the relationship of sensing amount detected by the mutual capacitive touch panel 100' of the comparison example versus position is represented by a curve C3, and the relationship of sensing amount detected by the mutual capacitive touch panel 100 of the first embodiment versus position is represented by a curve CV4. When the touching object TO is at the position P3, in the comparison example, the change in the coupling capacitance between the first electrode E14' and the first electrode strip EL1 of the electrode strip group ELM2 is reflected in the change in the coupling capacitance between the first electrode E12' and the second electrode strip EL2 of the electrode strip group ELM2, i.e., incorporated into the sensing amount corresponding to the position P2, as indicated by an arrow in FIG. 5B. Thus, when the touching object TO is at the position P3, in the comparison example, the sensing amounts detected by the first electrode E12' and the second electrode strip EL2 corresponding to position P2 are higher in accuracy, such that the detected position shifts towards the position P2. However, in this embodiment, when the touching object TO is at the position P3, the change in the coupling capacitance between the electrode E and the first electrode strip EL1 of the electrode strip group ELM2 corresponding to the position P4 is not reflected in the coupling capacitance between the electrode E and the second electrode strip EL2 of the electrode strip group ELM2 corresponding to the position P2, as the sensing amount indicated by an arrow in FIG. 5B. Therefore, the sensing amounts detected by the electrode E and the second electrode strip EL2 of the electrode strip group ELM2 corresponding to the position P2 are not interfered by the change in the coupling capacitance between the electrode E and the first electrode strip EL1 of the electrode strip group ELM2 corresponding to the position P4, thereby enhancing the detection accuracy for the touching object TO at the position P3.

As shown in FIG. 8, a motion trajectory TR1 (the dotted line in FIG. 8) represents the motion trajectory detected by the mutual capacitive touch panel 100' of the comparison example when the touching object TO moves equidistantly in a straight line at different positions on the Y-axis and along the X-axis direction, and a motion trajectory TR2 (the solid line in FIG. 8) represents the motion trajectory detected by the mutual capacitive touch panel 100 of the first embodiment when the touching object TO moves equidistantly in a straight line at different positions on the Y-axis and along the X-axis direction. In regard to the design of the comparison example, in which the first electrodes and the second electrodes are sequentially and alternatingly arranged along the column direction CD, as the position of the touching object TO is distanced farther away from the center line of the electrode strip groups, the offset in the position detected in the column direction CD gets larger, such that the touching points sensed appear in an alternatingly high and low density distribution when the touching object TO moves in a straight line along the column direction CD. In contrast, with the design of this embodiment, in which two adjacent electrodes E of each first electrode group EM1 and two adjacent electrodes E of each second electrode group EM2 are alternatingly arranged along the column direction CD, there is substantially no offset between the position detected and the actual position of the touching object TO in the column direction CD, thereby effectively enhancing the touch accuracy of the mutual capacitive touch panel 100, reducing the use of algorithms and hence the consumption of computation resources, and increasing the touch response time.

The mutual capacitive touch panel of the present invention is not limited to the above embodiment. To better compare differences of the first embodiment over other embodiments and to keep the description simple, the same components are represented by the same denotations, and the differences of the first embodiment over other embodiments are primarily described while the repeated details are omitted.

Figure 9:
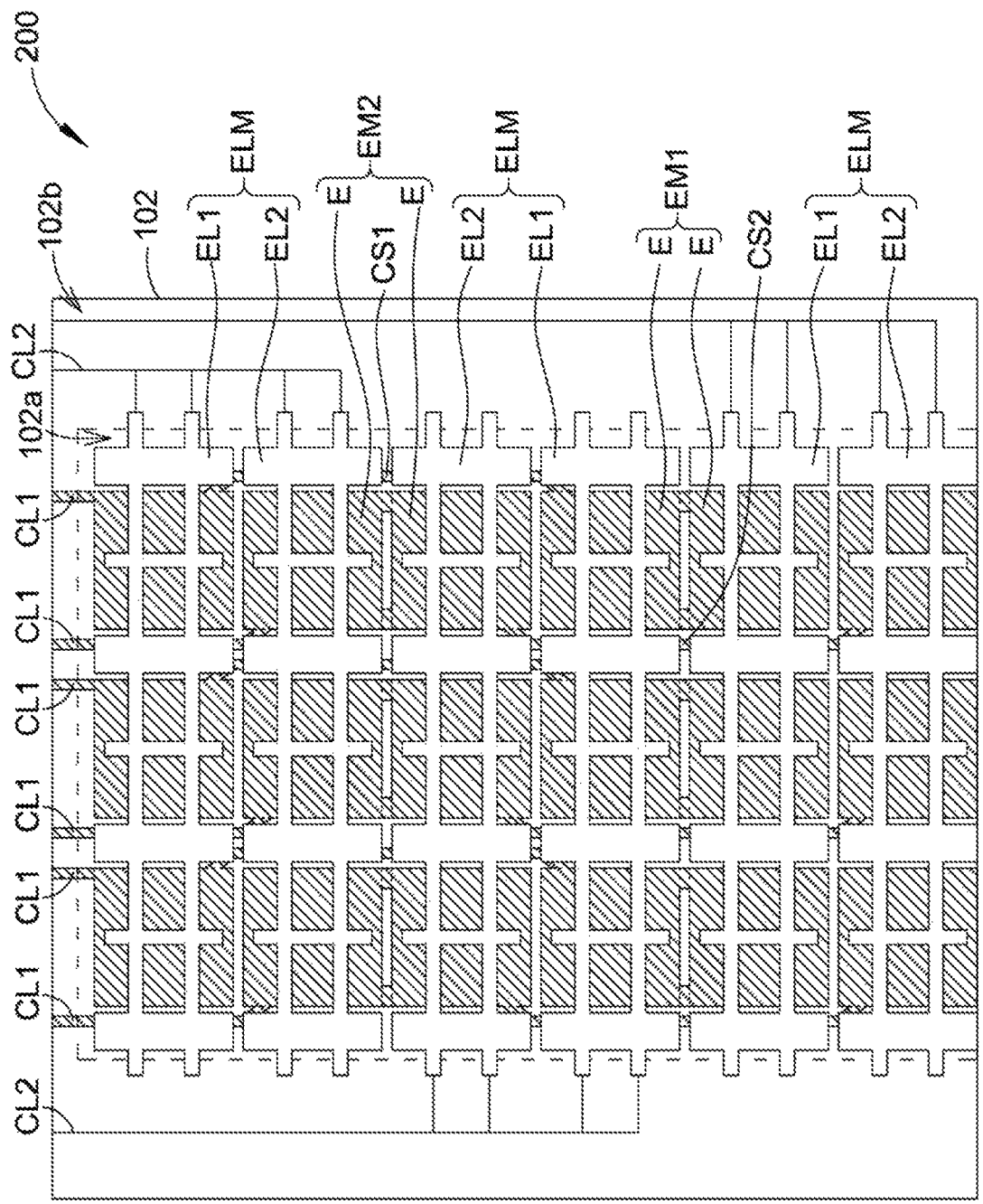
FIG. 9 is a top schematic diagram of a mutual capacitive touch panel according to a second embodiment of the present invention.
Figure 10:
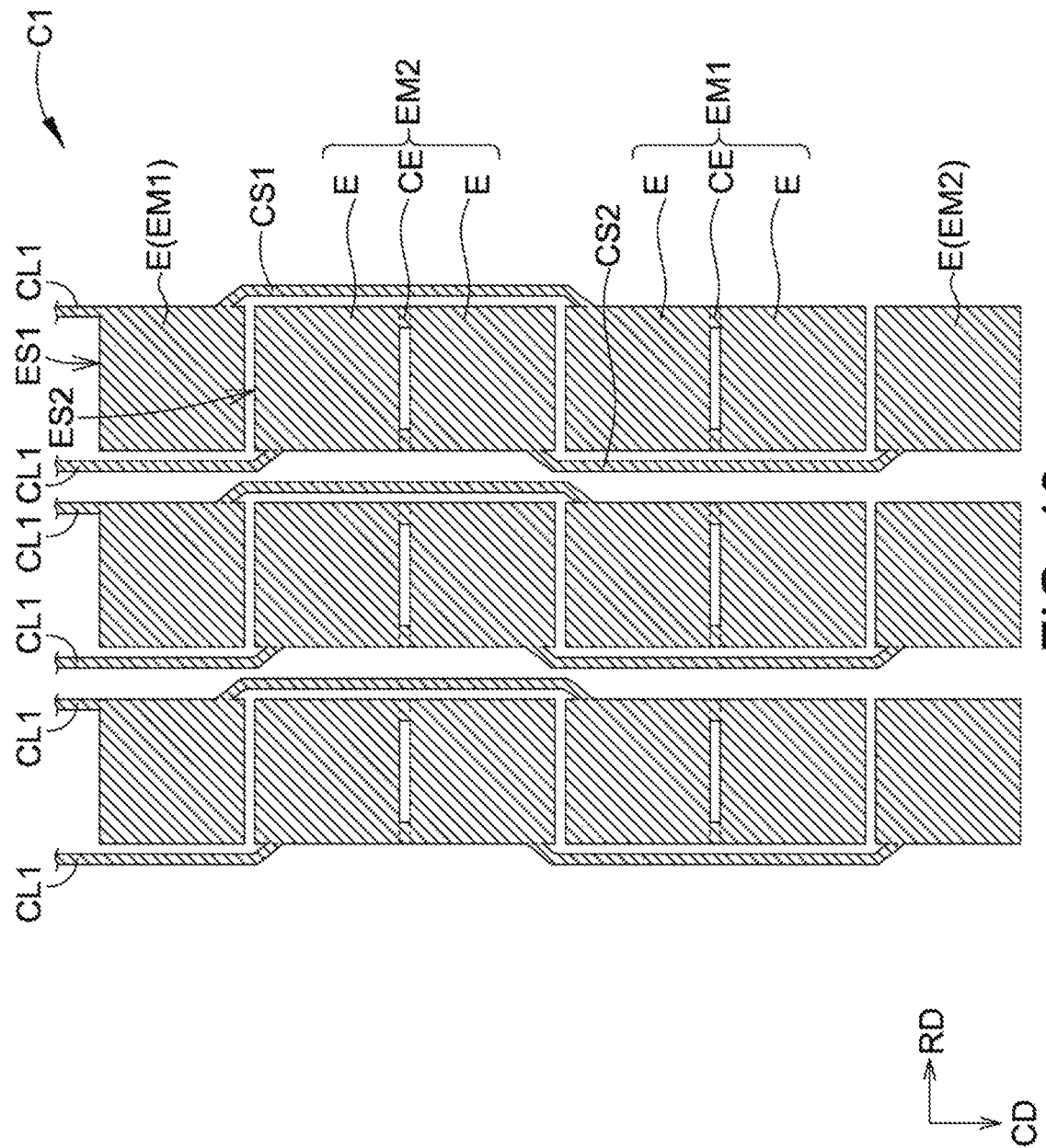
FIG. 10 is a top schematic diagram of a first electrode layer according to the second embodiment of the present invention.
Figure 11:
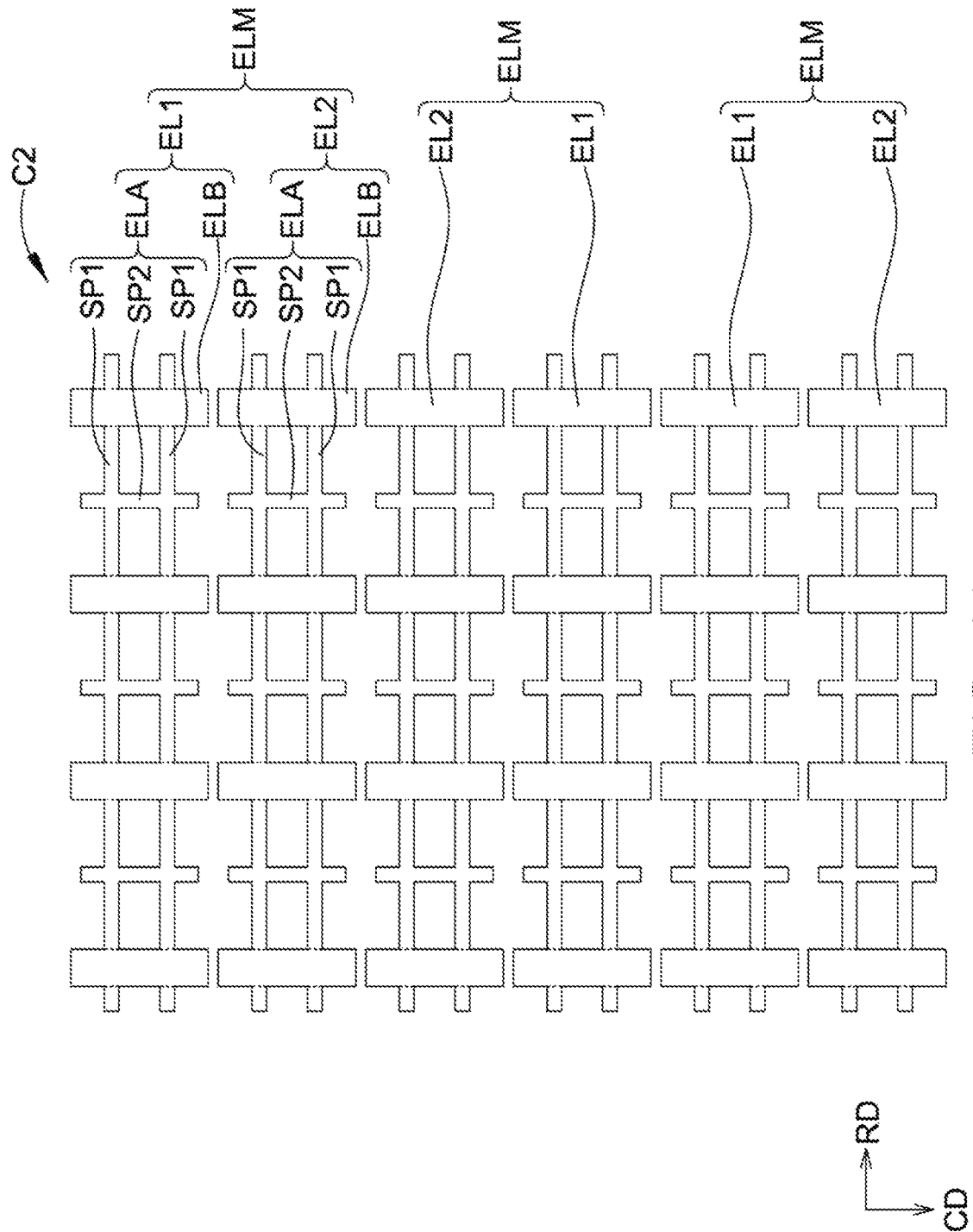
FIG. 11 is a top schematic diagram of a second electrode layer according to the second embodiment of the present invention.

Refer to FIG. 9 to FIG. 11. FIG. 9 shows a top schematic diagram of a mutual capacitive touch panel according to a second embodiment of the present invention. FIG. 10 shows a top schematic diagram of a first electrode layer according to the second embodiment of the present invention. FIG. 11 shows a top schematic diagram of a second electrode layer according to the second embodiment of the present invention. As shown in FIG. 9 to FIG. 11, compared to the first embodiment, in a mutual capacitive touch panel 200 provided by this embodiment, each electrode group may include two electrode connecting line segments CE provided between two electrodes E, and each electrode strip may include a plurality of electrode portions ELA and a plurality of shielding portions ELB, wherein the electrode portions ELA and the shielding portions ELB are sequentially and alternatingly connected in series along the row direction RD of the array. More specifically, in each electrode strip, each of the electrode portions ELB overlaps, in the perpendicular projection direction Z, one corresponding electrode E, such that each electrode portion ELA may be used to generate with the corresponding electrode E capacitance coupling and form a touch unit for detecting a position of a touching object, and each of the shielding portions ELB may overlap, in the perpendicular projection direction Z, one corresponding connecting line segment, such that each shielding portion ELB may be used for shielding the influence of coupling capacitance generated by each electrode portion ELA and the corresponding electrode E. In this embodiment, each electrode portion ELA may include two strip portions SP1 and a crossing portion SP2, the strip portions SP1 are connected between two shielding portions ELB and the crossing portion SP2 crosses the two strip portions SP1, yielding each electrode portion ELA to appear as a grating in shape. Further, the width of the shielding portions ELB in the column direction CD of the array is greater than the width of the strip portions SP1 in the column direction CD of the array, allowing the shielding portions ELB to effectively shield the connecting line segments. For example, the width of the shielding portions ELB in the column direction CD of the array is greater than by 10% or equal to the width of the electrodes E in the column direction CD of the array. Preferably, the width of the shielding portions ELB in the column direction CD of the array is greater than by 50% or equal to the width of the electrodes E in the column direction CD of the array. It should be noted that, no floating electrode is provided between two adjacent shielding portions ELB between the electrodes E of two adjacent columns, so as to prevent the connecting line segments from affecting the sensing of the electrode strips through the floating electrode. The shape of the electrode portions ELA is not limited to the above example. In another embodiment, according to product requirements, the shape of the electrode portions ELA may also be, for example, "#" or other shapes. In another embodiment, two adjacent shielding portions ELB of each electrode strip located between the electrodes E of two adjacent columns may be electrically connected to each other.

In another embodiment, The second electrode layer C2 may selectively further include a plurality of floating electrodes, which are separated from one another and are separated from the electrode strips, yielding the floating electrodes to be in a floating state. The floating electrodes may be provided between two adjacent electrode strips to fill the space between the electrode strips as much as possible. In addition to increasing the sensing amounts of the electrodes, the pattern of the electrode strips is not easily visually recognized by the human eye, further achieving the effect of keeping the mutual capacitive touch panel simple and easy to read.

Figure 12:
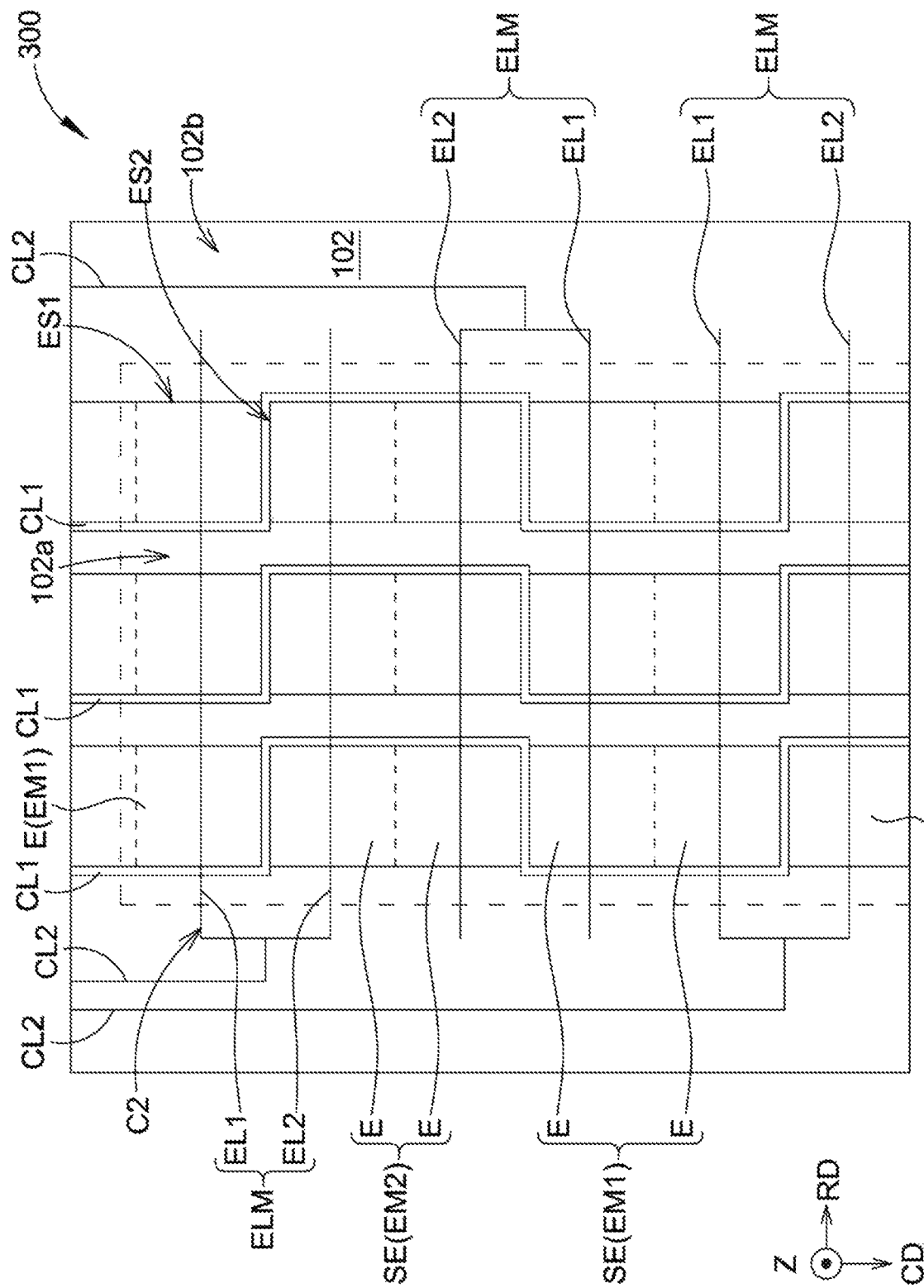
FIG. 12 a top schematic diagram of a mutual capacitive touch panel according to a third embodiment of the present invention.

FIG. 12 shows a top schematic diagram of a mutual capacitive touch panel according to a third embodiment of the present invention. As shown in FIG. 12, compared to the second embodiment, in a mutual capacitive touch panel 300 provided by this embodiment, two electrodes E of each electrode group are mutually connected to form one single electrode SE. That is to say, the first electrode group EM1 may be formed by the single electrode SE overlapping different electrode strip groups ELM, and the second electrode group EM2 may be formed by the single electrode SE overlapping different electrode strip groups ELM. Thus, the electrode groups in this embodiment do not require additional electrode connecting line segments.

Figure 13:
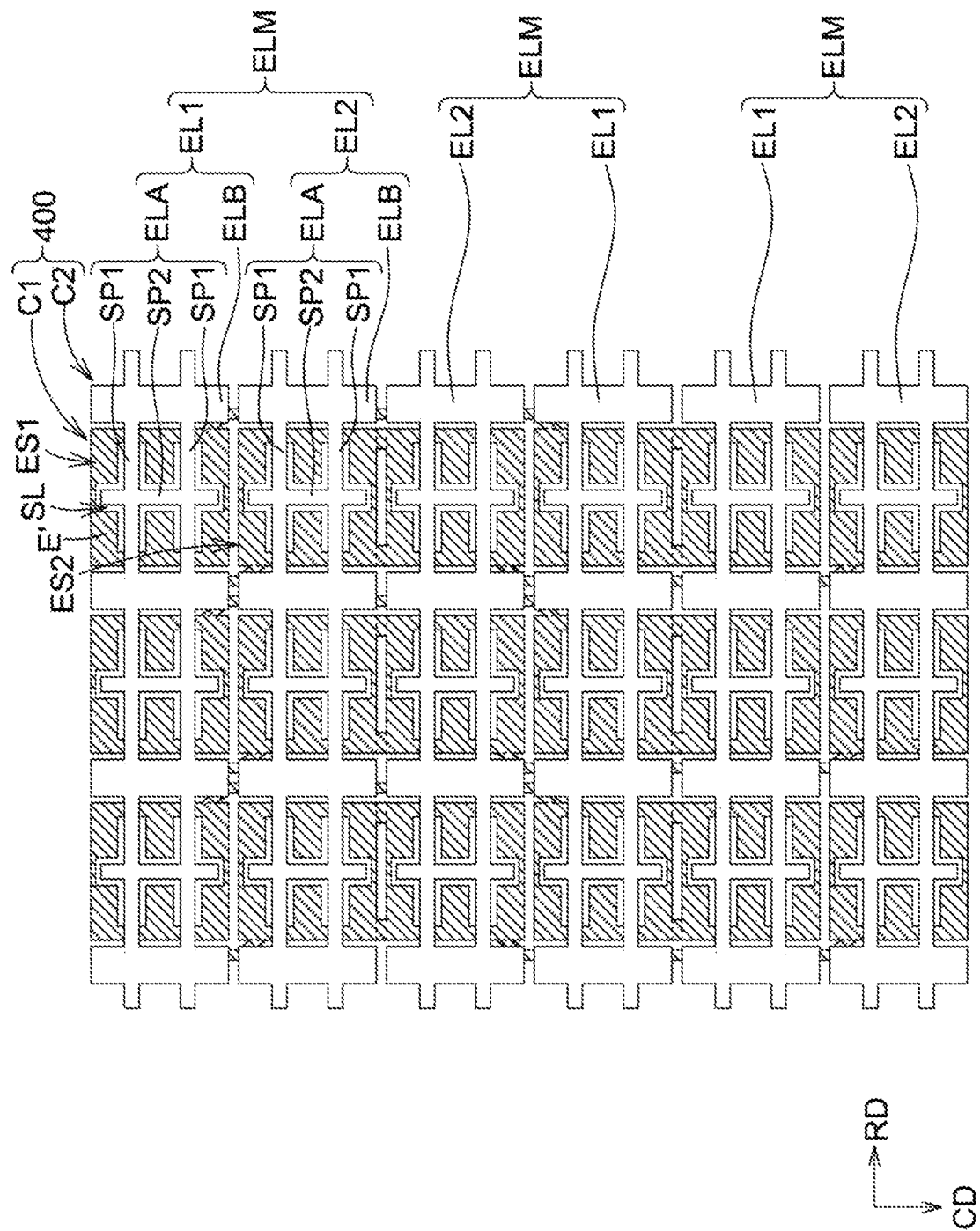
FIG. 13 a top schematic diagram of a mutual capacitive touch panel according to a fourth embodiment of the present invention.

FIG. 13 shows a top schematic diagram of a mutual capacitive touch panel according to a fourth embodiment of the present invention. As shown in FIG. 13, compared to the second embodiment, in a mutual capacitive touch panel 400 provided by this embodiment, each electrode E' may include an opening SL that substantially overlaps the corresponding electrode portion ELA. In this embodiment, the openings SL may also appear as a grating in shape, and substantially overlap two strip portions SP1 and the crossing portion SP2. Because the electrodes E' have the openings SL substantially overlapping the electrode portions ELA in this embodiment, the coupling capacitance between the electrodes E' and the electrode portions ELA may be reduced. For example, when the first electrode series ES1 and the second electrode series ES2 are respectively sensing electrodes and the electrode strip groups ELM are driving electrodes, a large part of the electric power lines produced by each electrode strip group ELM are extended onto the electrodes E' that are not shielded by the electrode strip groups ELM, such that a change in a greater number of electric power lines is caused by a touch of a touching object. Therefore, the openings SL can increase the capacitance change detected by the electrodes E'. In another embodiment, the first electrode layer C1 may include floating electrodes respectively provided in the openings SL.

Figure 14:
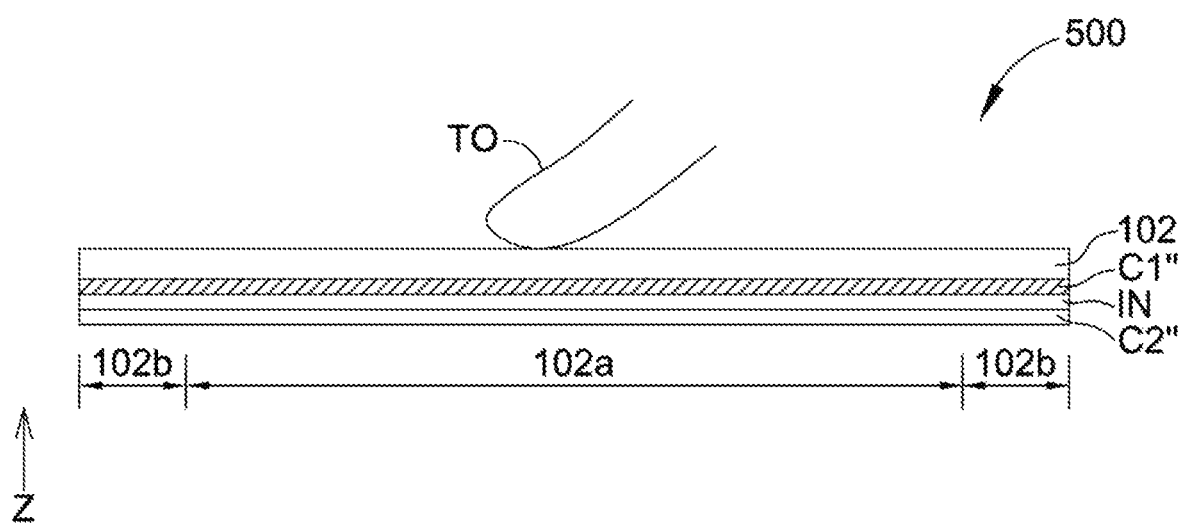
FIG. 14 a side schematic diagram of a mutual capacitive touch panel according to a fifth embodiment of the present invention.
Figure 15:
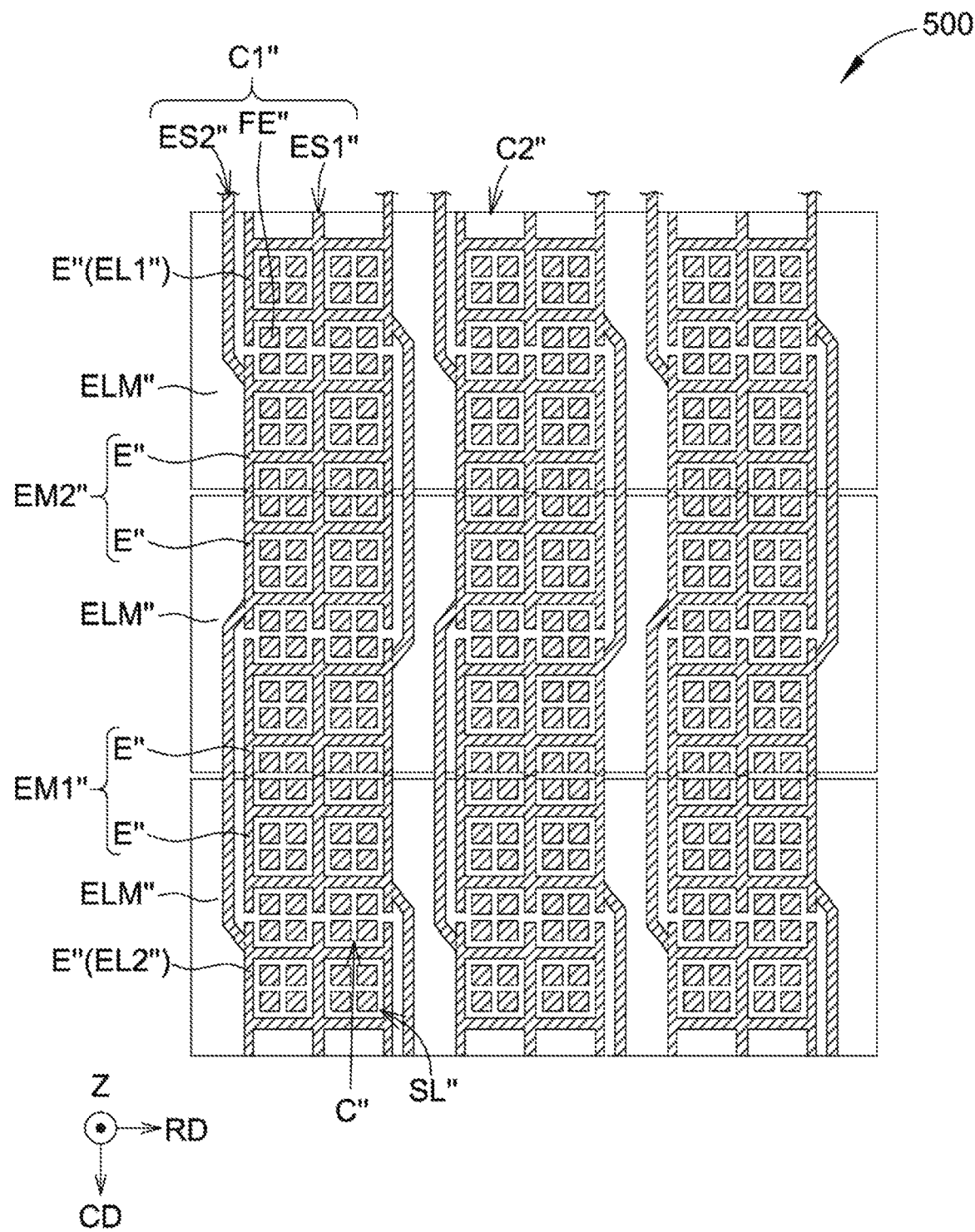
FIG. 15 a top schematic diagram of a mutual capacitive touch panel according to the fifth embodiment of the present invention.

Refer to FIG. 14 and FIG. 15. FIG. 14 shows a side schematic diagram of a mutual capacitive touch panel according to a fifth embodiment of the present invention. FIG. 15 shows a top schematic diagram of a mutual capacitive touch panel according to the fifth embodiment of the present invention. As shown in FIG. 14 and FIG. 15, compared to the first embodiment, in a mutual capacitive touch panel 500 provided by this embodiment, a first electrode layer C1" is closer to the touching object TO compared to a second electrode layer C2". In this embodiment, for example but not limited to, electrode strip groups ELM" are located in the second electrode layer C2", and first electrode series ES1" and second electrode series ES2" are located in the first electrode layer C1". In another embodiment, the electrode strip groups ELM" may also be located in the first electrode layer C1", and the first electrode series ES1" and second electrode series ES2" are located in the second electrode layer C2". Further, the electrode strips of each of the electrode strip groups ELM" may be combined into one single electrode strip, for example but not limited to. In another embodiment, each electrode strip group ELM" may also include two mutually electrically connected electrode strips. Further, two electrodes E" of each electrode group in this embodiment may be mutually connected, and each electrode E" may include a plurality of indentations C" and a plurality of openings SL" that overlap, in the perpendicular projection direction Z, the electrode strip groups ELM", so as to allow the electric power lines produced from the coupling capacitance between the electrode strips and the electrodes E" to extend onto an upper surface of the electrodes E" through the indentations C" and the openings SL", and to allow the touch of the touching object TO to change the density of the electric power lines and further cause a change in the coupling capacitance. In this embodiment, the first electrode layer C1" may further include a plurality of floating electrodes FE" respectively provided in the openings SL" and the indentations C" of the electrodes E". The indentations C" of two adjacent electrodes E" of the same column may be provided opposite each other to place therein the floating electrodes FE". The floating electrodes FE" are separated from one another and are also separated from the electrodes E", and thus the floating electrodes FE" are electrically connected to neither the electrodes E" nor other signal terminals, yielding the floating electrodes FE" to be in a floating state. For the electrodes E" of the same column, each electrode E" has two opposite sides in the row direction RD, and the floating electrodes FE" corresponding to the electrodes E" of this column need to be provided between the two opposite sides. In another embodiment, the first electrode layer C1" may not include any floating electrodes. In this embodiment, for example but not limited to, the first electrode series ES1" and the second electrode series ES2" may respectively be sensing electrodes for generating sensing signals according to the corresponding driving signals, and the electrode strip groups ELM" are driving electrodes for transmitting driving signals. In another embodiment, the first electrode series ES1" and the second electrode series ES2" may respectively be driving electrodes, and the electrode strip groups ELM" may be sensing electrodes.

In conclusion, in the mutual capacitive touch panel of the present invention, two adjacent electrodes of each first electrode group and two adjacent electrodes of each second electrode group are designed to be sequentially and alternatingly arranged along the column direction of the array.

Thus, there is no offset between the position of detected in the column direction and the actual position of the touching object, thereby effectively enhancing the touch accuracy in the column direction (the Y-axis), reducing the use of algorithms and hence the consumption of computation resources, and increasing the touch response time.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A mutual capacitive touch panel, for detecting a touch position of a touching object, comprising:
    a first electrode layer, comprising a plurality of electrode groups arranged in an array, wherein the electrode groups comprise a plurality of first electrode groups and a plurality of second electrode groups, in each column of the array, the first electrode groups and the second electrode groups located in a same column are sequentially and alternatingly arranged, the first electrode groups located in the same column are electrically connected to form a first electrode series, and the second electrode groups located in the same column are electrically connected to form a second electrode series;
    a second electrode layer, disposed on the first electrode layer, the second electrode layer comprising a plurality of electrode strip groups insulated from one another and sequentially arranged in a touch region along a column direction of the array, wherein each of the electrode strip groups extends along a row direction of the array and overlaps, in a perpendicular projection direction, the electrode groups of two adjacent rows, and two adjacent of the electrode strip groups overlap, in the perpendicular projection direction, the electrode groups of the same row; and
    an insulation layer, provided between the first electrode layer and the second electrode layer;
    wherein, in each column, a first side electrode is adjacent to each of a first-row electrode group and a second side electrode is adjacent to a last-row electrode group of the electrode groups and each of the electrode groups at least comprises two electrodes arranged along the column direction of the array, and two adjacent of the electrodes of each of the first electrode groups and two adjacent of the electrodes of each of the second electrode groups in each column are sequentially and alternatingly arranged along the column direction of the array.

2. The mutual capacitive touch panel according to claim 1, wherein the two adjacent electrode strip groups respectively overlap, in the perpendicular projection direction, the electrodes of at least one of the electrode groups.

3. The mutual capacitive touch panel according to claim 2, wherein the electrodes of each of the electrode groups are separated from one another, and each of the electrode groups further comprises an electrode connecting line segment connecting the electrodes of each of the electrode groups.

4. The mutual capacitive touch panel according to claim 2, wherein the electrodes of each of the electrode groups are connected to each other.

5. The mutual capacitive touch panel according to claim 2, wherein each of the electrode strip groups comprise a first electrode strip and a second electrode strip mutually electrically connected and extending along a row direction of the array, two adjacent first electrode strips respectively overlap, in the perpendicular projection direction, the electrodes of two adjacent rows of the first electrode groups of the same row, and two adjacent second electrode strips respectively overlap, in the perpendicular projection direction, the electrodes of two adjacent rows of the second electrode groups of the same row, wherein one row comprises one of the first electrode groups or one of the second electrode groups.

6. The mutual capacitive touch panel according to claim 5, wherein each of the first electrode strips mutually capacitively couples with one corresponding of the overlapping electrodes to form a touch unit, and each of the second electrode strips mutually capacitively couples with one corresponding of the overlapping electrodes to form another touch unit.

7. The mutual capacitive touch panel according to claim 5, wherein the first electrode strip and the second electrode strip of each of the electrode strip groups respectively overlap, in the perpendicular projection direction, the electrode groups of two adjacent rows.

8. The mutual capacitive touch panel according to claim 5, wherein every two adjacent first electrode strips and every two adjacent second electrode strips are sequentially and alternatingly arranged in the column direction of the array.

9. The mutual capacitive touch panel according to claim 5, further comprising:
    a plurality of conductive lines, disposed in a border region, and respectively electrically connected to the first electrode strip and the second electrode strip.

10. The mutual capacitive touch panel according to claim 5, wherein each of the first electrode strips and each of the second electrode strips respectively comprise a plurality of electrode portions, and each of the electrode portions overlaps one corresponding of the electrodes.

11. The mutual capacitive touch panel according to claim 10, wherein each of the electrodes comprises an opening, and the openings substantially overlap the electrode portions.

12. The mutual capacitive touch panel according to claim 1, wherein the first electrode layer further comprises a plurality of a first connecting line segments and a plurality of second connecting line segments, each of the first connecting line segments is connected between two adjacent first electrode groups of the same column, and each of the second connecting line segments is connected between two adjacent second electrode groups of the same column.

13. The mutual capacitive touch panel according to claim 1, wherein the first electrode series and the second electrode series are respectively driving electrodes, and the electrode strip groups are respectively sensing electrodes.

14. The mutual capacitive touch panel according to claim 1, wherein the first electrode series and the second electrode series are respectively sensing electrodes, and the electrode strip groups are respectively driving electrodes.

15. The mutual capacitive touch panel according to claim 1, wherein the second electrode layer is closer to the touching object compared to the first conductive layer.

16. The mutual capacitive touch panel according to claim 1, wherein the first electrode layer is closer to the touching object compared to the second electrode layer.

* * * * *